United States Patent [19]

Wada et al.

[11] 4,450,810

[45] May 29, 1984

[54] DEVICE FOR CONTROLLING SPARK TIMING AND FUEL INJECTION OF AN INTERNAL COMBUSTION ENGINE

[75] Inventors: Hiroki Wada, Toyota; Yasuhiro Ikuta, Okazaki, both of Japan

[73] Assignee: Toyota Jidosha Kabushiki Kaisha, Aichi, Japan

[21] Appl. No.: 415,993

[22] Filed: Sep. 8, 1982

[30] Foreign Application Priority Data

Jan. 21, 1982 [JP] Japan .................................. 57-6856

[51] Int. Cl.³ ............................................ F02D 37/02
[52] U.S. Cl. .................................... 123/425; 123/435
[58] Field of Search ................. 123/425, 435, 419, 436

[56] References Cited

U.S. PATENT DOCUMENTS

| | | | |
|---|---|---|---|
| 4,197,767 | 4/1980 | Leung | 123/436 |
| 4,314,534 | 2/1982 | Nakajima et al. | 123/435 |
| 4,364,353 | 12/1982 | Fiala | 123/425 |

Primary Examiner—Andrew M. Dolinar
Attorney, Agent, or Firm—Parkhurst & Oliff

[57] ABSTRACT

A knock control device of an internal combustion engine incorporated with a device for controlling the spark timing and the fuel injection.

The device for controlling the spark timing and the fuel injection comprises an electronic control unit. A knock sensor is mounted on the cylinder block for sensing knocking. When the output of the knock sensor is above a first predetermined level, retardation of spark timing is caused. When the output of the knock sensor is above a second level above the first level, retardation of spark timing is caused and the amount of fuel to be injected is increased.

5 Claims, 2 Drawing Figures

DEVICE FOR CONTROLLING SPARK TIMING AND FUEL INJECTION OF AN INTERNAL COMBUSTION ENGINE

FIELD OF THE INVENTION

The present invention relates to an internal combustion engine having an electronic fuel injection system, more specifically to a technique for controlling knock by controlling the spark timing and fuel injection in the engine.

BACKGROUND OF THE INVENTION

Many internal combustion engines utilize electronic fuel injection systems to control spark timing and fuel injection. Some engines have knock control devices to immediately extinguish knocking caused under various engine conditions. These devices include a knock sensor, mounted on or near the engine. They retard the spark timing by a predetermined angle from the angle in the case of no knocking when the output of the knock sensor exceeds a predetermined level.

The above-mentioned devices, however, can only retard spark timing a certain angle (for example, one degree or a few degrees) relative to the crankshaft. They cannot operate fast enough for large knock. "Large knocking" as used in this description, refers to a knock sound or oscillation which has large amplitude and/or does not disappear for a long period.

Further, since engine performance or emission control considerations restrict the angle of retardation of spark timing to a certain range, the above-described devices controlling just spark timing are not sufficient to handle large knocking.

Knocking, as is widely recognized, causes the extreme engine overheating and damage. It is necessary and desirable to extinguish it immediately when it appears.

SUMMARY OF THE INVENTION

It is an object of the present invention to provide a device for controlling spark timing and fuel injection in an internal combustion engine, which enables immediately extinguishing of knocking, especially large knocking.

The present invention provides for a device for controlling spark timing and fuel injection of an internal combustion engine. The device comprises an electronic control unit for controlling the spark timing and the amount of fuel to be injected at a predetermined pattern in response to engine operating conditions, a knock sensor mounted on or near a cylinder block of the engine for sensing knocking, a first circuit means responsive to the output of the knock sensor for producing a first control signal retarding spark timing from the predetermined pattern when the output of the knock sensor is above a first predetermined level, a and a second circuit means responsive to the output of the knock sensor for producing a second control signal causing the amount of fuel to be injected to increase beyond said predetermined pattern when the output of the knock sensor is above a second predetermined level above the first predetermined level.

BRIEF DESCRIPTION OF THE DRAWINGS

The present invention will become more apparent from the following description of a preferred embodiment in connection with the attached drawings, wherein.

DESCRIPTION OF A PREFERRED EMBODIMENT

Figure 1:
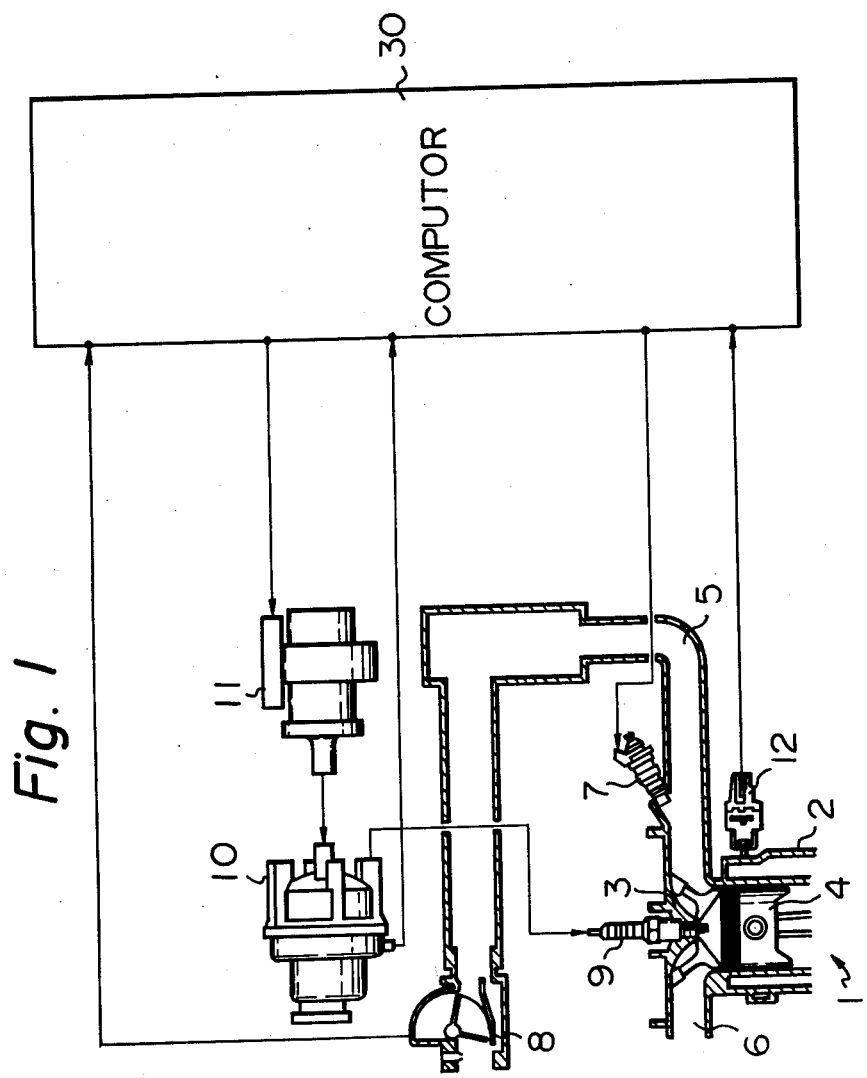
FIG. 1 is a diagrammatic view illustrating the arrangement of an internal combustion engine according to the present invention and FIG. 2 is an electronic circuit of a device for controlling spark timing and fuel injection of an internal combustion engine according to the present invention.

FIG. 1 shows one of the cylinders in an internal combustion engine, represented by the numeral 1. In cylinder 1, cylinder block 2, cylinder head 3, piston 4, intake manifold 5, and exhaust manifold 6 are provided. Injector 7 for fuel is provided on intake manifold 5 near intake valve 5', and air flow meter 8 is on the upstream side thereof. Air is sucked through an air cleaner (not shown), mixed with fuel injected through injector 7, and is introduced into a combustion chamber formed between cylinder head 3 and piston 4. When it passes through airflow meter 8, the amount of flowing air to be introduced into the combustion chamber is measured.

Numeral 9 indicates a spark plug which is electrically connected to ignitor 11 through distributor 10. Knock sensor 12 is mounted on cylinder block 2 for sensing knock sounds. Knock sensor 12 may be of any type providing an electric output signal responsive to knocking. In this embodiment, the engine has one such sensor, not one for each cylinder. Alternatively, the engine can have two such knock sensors 12, each mounted on separate cylinders located remote from each other. In this arrangement, large knocking can be judged by the sensing, by one sensor, of the knock oscillation of the remote cylinder.

Airflow meter 8 provides an electric signal which represents the amount of flowing air to be introduced into the combustion chamber. This signal is input to electronic computer 30. At the same time, an electric signal from distributor 10, representing the revolution of the engine, and an electric signal from knock sensor 12, representing the knocking, are input to electronic computor 30. Electronic computor 30 receives these updated inputs and executes the arithmetic and logic processing on the basis of these inputs and delivers control signals to ignitor 11 and injector 7 for controlling spark timing and fuel injection.

Figure 2:
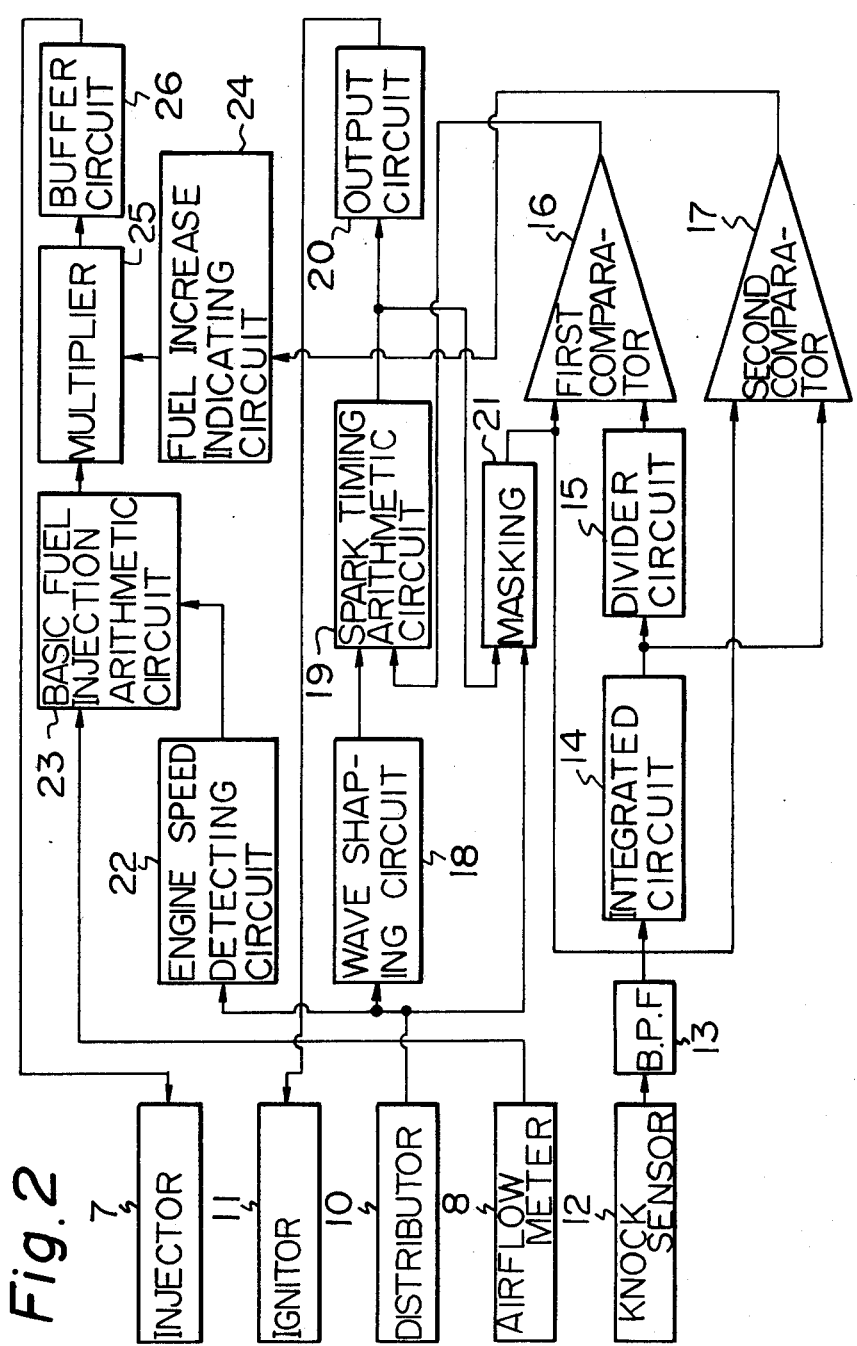

FIG. 2 shows an example of an electronic circuit of the device for controlling spark timing and fuel injection, according to the present invention.

An electric signal from knock sensor 12 is passed through band pass filter 13 to provide a selected frequency component within a suitable band width within which knocking typically appears. The signal is then branched into three ways. One of these branched signals passes through integrated circuit 14 to provide a predetermined knocking level. The signal from integrated circuit 14 is further branched into two ways. One of these two branched signals passes through divider circuit 15 to provide a further predetermined knocking level. In this embodiment, the further predetermined level from divider circuit 15 is a first predetermined level below a second predetermined level originally produced from integrated circuit 14. The voltages of these two predetermined levels are input to first comparator 16 and second comparator 17, respectively, together with the raw voltage of each of the remaining two of the three branched signals. First comparator 16 compares the output of knock sensor 12 with the first predetermined level from integrated circuit 14 and divider circuit 15 to provide a first output which lasts for the period during which the amplitude of knocking exceeds the first predetermined level. Second comparator 17 compares the output of knock sensor 12 with the second predetermined level from integrated circuit 14 to provide a second output which lasts for the period during which large knocking is caused, the amplitude of the knock oscillation being above the second predetermined level above the first predetermined level.

Distributor 10 outputs an electric signal to electronic computer 30. This signal is passed through wave shaping circuit 18 to become a pulse waveform which is input to spark timing arithmetic circuit 19. Normally, spark timing is executed to advance at a predetermined pattern as the engine speed increases. The output of first comparator 16 is also input to spark timing arithmetic circuit 19 so that this circuit is adapted to produce the spark timing control signal retarded from the advanced timing signal at the predetermined pattern when the knocking appears. The control signal from spark timing arithmetic circuit 19 is output to ignitor 11 through output circuit 20. Masking gate 21, receiving signals from distributor 10 and spark timing arithmetic circuit 19, is connected to the knock comparating circuit for closing the gate to avoid misjudging sound similar to the knocking.

The signal from distributor 10 is also supplied to engine speed detecting circuit 22, an output of which is input to basic fuel injection arithmetic circuit 23 together with the signal from airflow meter 8 indicating the amount of flowing air. Basic fuel injection arithmetic circuit 23 sets out the amount of fuel to inject in accordance with the driving condition. Above-described second comparator 17 is connected to fuel increase indicating circuit 24. Both signals from basic fuel injection circuit 23 and fuel increase indicating circuit 24 are input to multiplier 25, where both signals are multiplied for increasing the amount of fuel to inject more than the usual amount if second comparator 17 detects the large knocking. This fuel injection signal is output to injector 7 through buffer circuit 26.

With the above control device, only the spark timing is controlled to be retarded when first comparator 16 judges the output of knock sensor 12 to be above the first predetermined level. When second comparator 17 judges the output of knock sensor 12 to be above the second predetermined level above the first predetermined level, the increased fuel is injected from injector 7 simultaneously with the retardation of spark timing. Therefore, the air-fuel-ratio becomes rich while the large knocking appears. This immediately extinguishes the knock due to the sudden change of the air-fuel-ratio.

It is also possible to inject the fuel from a cold start injector, if provided, to increase the fuel in response to the large knocking detecting means. This is advantageous in such engines as the injectors thereof are not of great enough capacities.

It is further possible to detect large knocking by sensing the continuing period of the knocking above the predetermined level and to increase the amount of fuel to be injected simultaneously with the retardation of spark timing.

It is apparent from the above description that the device according to the present invention enables to immediate extinguishing of knocking. Thus, the engine is prevented from damage and the driving performance is enhanced.

We claim:

1. A device for controlling spark timing and fuel injection of an internal combustion engine, said device comprising:
   an electronic control unit for controlling spark timing and the amount of fuel to be injected at a predetermined pattern in connection with the driving conditions;
   a knock sensor mounted adjacent to a cylinder block of the engine, the knock sensor detecting whether an engine is knocking and producing an output;
   a first circuit means responsive to the output of the knock sensor, the first circuit means producing a first control signal retarding the spark timing from said predetermined pattern when the output of the knock sensor is above a first predetermined level; and
   a second circuit means responsive to the output of the knock sensor, the second circuit means producing a second control signal increasing the amount of fuel to be injected beyond said predetermined pattern when the output of the knock sensor is above a second predetermined level above said first predetermined level.

2. A device according to claim 1, wherein a band pass filter means is provided to pass a selected band width of the knock sound within which the knocking typically occurs.

3. A device according to claim 2, wherein one of said first and second circuit means comprises an integrated circuit means connected to the knock sensor to provide one of said first and second predetermined levels, and the other comprises a divider circuit means connected to said integrated circuit means to provide the other predetermined level.

4. A device according to claim 3, wherein said first and second circuit means comprises comparator means to respectively provide said first and second control signals in comparison with the output of the knock sensor through said band pass filter with said respective first and second predetermined levels provided by said integrated circuit means and said divider circuit means.

5. A device according to claim 4, wherein said first circuit means further comprises an ignition retard arithmetic circuit, and said second circuit means further comprises a fuel increase indicating circuit.

* * * * *